(12) United States Patent
Mobin et al.

(10) Patent No.: US 8,737,549 B2
(45) Date of Patent: May 27, 2014

(54) RECEIVER HAVING LIMITER-ENHANCED DATA EYE OPENINGS

(75) Inventors: Mohammad Mobin, Orefield, PA (US); Pervez Aziz, Dallas, TX (US); Ye Liu, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 19 days.

(21) Appl. No.: 13/459,871

(22) Filed: Apr. 30, 2012

(65) Prior Publication Data

US 2013/0287088 A1    Oct. 31, 2013

(51) Int. Cl.
*H03K 5/01* (2006.01)

(52) U.S. Cl.
USPC ............................................. 375/350

(58) Field of Classification Search
USPC .................... 375/350, 375; 455/307
See application file for complete search history.

(56) References Cited

U.S. PATENT DOCUMENTS

| | | | |
|---|---|---|---|
| 4,561,091 A | 12/1985 | Scholl et al. | |
| 4,754,465 A | 6/1988 | Trimble | |
| 5,438,692 A | 8/1995 | Mohindra | |
| 5,451,899 A | 9/1995 | Lawton | |
| 5,533,064 A | 7/1996 | Ichihara | |
| 5,943,370 A | 8/1999 | Smith | |
| 6,614,842 B1 * | 9/2003 | Chou et al. ................. | 375/232 |
| 7,447,262 B2 | 11/2008 | Tseng et al. | |
| 7,551,667 B2 | 6/2009 | Christensen | |
| 7,564,866 B2 | 7/2009 | Agazzi et al. | |
| 7,711,043 B2 | 5/2010 | Mobin et al. | |
| 8,040,984 B2 | 10/2011 | Aziz et al. | |
| 8,315,301 B1 * | 11/2012 | He ............................... | 375/233 |
| 2008/0080609 A1 | 4/2008 | Mobin et al. | |
| 2009/0086807 A1 | 4/2009 | Aziz et al. | |
| 2009/0129457 A1 * | 5/2009 | Akahori ...................... | 375/232 |
| 2010/0255792 A1 * | 10/2010 | Moloudi et al. ............. | 455/73 |
| 2010/0329322 A1 | 12/2010 | Mobin et al. | |

OTHER PUBLICATIONS

David G. Ross, Stanley F. Moyer, Wallace H. Eckton, Jr., Robert M. Paski, David G. Ehrenberg; Regenerator Chip Set for High-Speed Digital Transmission; IEEE Journal of Solid-State Circuits, vol. SC-21, No. 2, Apr. 1986.

Jeffrey H. Sinsky, Marcus Duelk, Andrew Adamiecki; High-Speed Electrical Backplane Transmission Using Duobinary Signaling; IEEE Transactions on Microwave Theory and Techniques, vol. 53, No. 1, Jan. 2005.

* cited by examiner

*Primary Examiner* — Chieh M Fan
*Assistant Examiner* — Tanmay Shah (57) ABSTRACT

A communication system having a receiver with a linear path and a nonlinear path. As the receiver receives a data signal, it adaptively equalizes the received signal, and amplitude-limits the equalized signal in the nonlinear path using a saturable amplifier limiter or the like. A slicer extracts data from the limited equalized received signal. In the linear path, a clock recovery circuit generates a clock signal from the equalized received signal. A delay circuit in the linear path at least partially compensates for propagation delay in the limiter. Having the clock recovery occur in other than the nonlinear path, a low jitter clock is generated. The limiter enhances the vertical opening of the data eye by increasing the rise and fall times of the limited signal, providing more noise margin for the slicer to operate with and a greater timing margin in which to sample the sliced data.

12 Claims, 4 Drawing Sheets

RECEIVER HAVING LIMITER-ENHANCED DATA EYE OPENINGS

BACKGROUND

Multi-gigabit per second (Gbps) communication between various chips or "ports" on a circuit board or modules on a backplane has been in use for quite a while. Data transmission is usually from a transmitter that serializes parallel data for transmission over a communication media, such as twisted pair conductors as a cable or embedded in a backplane, fiber optic cable, or coaxial cable(s), to a receiver that recovers the transmitted data and deserializes the data into parallel form. However, data transmission greater than 20 Gbps over communication paths has been difficult to achieve because various signal impairments, such as intersymbol interference (ISI), crosstalk, echo, and other noise, can corrupt the received data signal to such an extent that a receiver having various decision feedback and analog equalizers might not be able to recover the transmitted data at the desired high data rate with an acceptable level of error performance. One possible reason for this shortcoming is that data rates 20 Gbps and higher are approaching the maximum speed of the transistors used to implement the receiver, reducing the amount of signal processing that can be achieved to improve the quality (e.g., the amount of "eye opening") of the received signal. Further, because power consumed by CMOS circuitry is generally proportional to the frequency of signals being processed by the circuitry, the amount of power consumed by a receiver operating at these data rates might be unacceptably high when the receiver is providing the acceptable level of error performance.

One way to improve the quality of the received signal is for the signal transmitter, operating in conjunction with the signal processing circuitry in the receiver, to drive the channel with signals that have been pre-distorted by a filter. One such filter used to pre-distort the transmitted signal is a finite-impulse response (FIR) filter with adjustable coefficients or taps, referred to herein as a TXFIR filter. With most common data communication standards (e.g., PCIe Gen3, SAS-3, 16GFC, and 10GBASE-KR, all of which are included herein by reference in their entirety), the coefficients of the TXFIR filter are controlled by the receiver using a back channel from the receiver to the transmitter. However, as with receivers, the high data rates are approaching the speed of the transistors in the transmitter, thereby reducing the amount of pre-distortion the TXFIR can provide. Further, as a consequence of using as high a speed transistors as possible in the transmitter, the voltage handling capability of the transistors is concomitantly reduced so that the amplitude of the data signals from the transmitter are reduced and further degrading the quality of the signals at the receiver.

Therefore, it is desirable to provide a receiver that can readily process 20 Gbps or higher data rates at an acceptable level of power consumption.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter.

One embodiment of the invention is a receiver having an input and adapted to receive a signal from a communication channel. The receiver comprises an equalizer, a limiter, a decision circuit, and a clock recovery circuit. The equalizer is coupled to the input of the receiver and the limiter is coupled to an output of the equalizer. The decision circuit, having a clock input, is coupled to an output of the limiter. The clock recovery circuit, coupled to an output of the equalizer and not connected to the output of the limiter, generates a clock signal that is coupled to the clock input of the decision circuit.

In another embodiment of the invention, a method of receiving a data signal in a receiver having a linear path and a nonlinear path, comprises the steps of recovering, from the nonlinear path, data from the received data signal; and recovering, from the linear path, a clock synchronized to the received data signal.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

In addition to the patents referred to herein, each of the following patents and patent applications are incorporated herein by reference in their entirety:

U.S. Pat. No. 7,599,461, titled "Method and Apparatus for Generating One or More Clock Signals for a Decision-Feedback Equalizer Using DFE Detected Data in the Presence of an Adverse Pattern", by Aziz et al.

U.S. patent application Ser. No. 12/776,681, titled "A Compensated Phase Detector for Generating One or More Clock Signals Using DFE Detected Data in a Receiver", by Aziz et al.

U.S. Pat. No. 8,040,984, titled "Methods and Apparatus for Improved Jitter Tolerance in an SFP Limit Amplified Signal", by Pervez Aziz et al.

U.S. patent application Ser. No. 13/360,978, filed 30 Jan. 2012, titled "Transmitter Adaptation Loop Using Adjustable Gain and Convergence Detection", by Mohammad Mobin et al.

U.S. patent application Ser. No. 11/541,379, filed 29 Sep. 2006, titled "Method and Apparatus for Non-Linear Decision-Feedback Equalization In the Presence of Asymmetric Channel", by Mohammad Mobin et al.

U.S. patent application Ser. No. 12/493,435, filed 29 Jun. 2009, titled "Real-Time Eye Monitor for Statistical Filter Parameter Calibration", by Mohammad Mobin et al.

U.S. patent application Ser. No. 11/864,110, filed 28 Sep. 2007, titled "Methods and Apparatus for Determining Threshold of One or More DFE Transition Latches Based on Incoming Data Eye", by Pervez Aziz et al.

U.S. Pat. No. 7,711,043, filed 29 Sep. 2006, titled "Method and Apparatus for Determining Latch Position for Decision-Feedback Equalization Using Single-Sided Eye", by Mohammad Mobin et al.

For purposes of this description and unless explicitly stated otherwise, each numerical value and range should be interpreted as being approximate as if the word "about" or "approximately" preceded the value of the value or range. The term "or" should be interpreted as inclusive unless stated otherwise. Further, signals and corresponding nodes, ports, inputs, or outputs may be referred to by the same name and are interchangeable. Additionally, reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the terms "implementation" and "example".

Also for purposes of this description, the terms "couple," "coupling," "coupled," "connect", "connecting", or "connected" refer to any manner known in the art or later developed in which a signal is allowed to be transferred between two or more elements and the interposition of one or more additional elements is contemplated, although not required. Conversely, the terms "directly coupled", "directly connected", etc., imply the absence of such additional elements.

As data rates increase for serializer/deserializer (SERDES) applications, the channel quality degrades and the use of decision feedback equalization (DFE) in conjunction with an finite impulse response (FIR) filter in a transmitter (TX) and an analog equalizer within a receiver (RX) is generally used to achieve the bit error rate (BER) performance needed for reliable communications.

A digital receiver, such as the receiver 10 shown in FIG. 1 and explained in more detail below, recovers digital signals by sampling baseband analog waveform (the received signal) and then reliably detect the sampled data. Signals arriving at a receiver are typically corrupted by intersymbol interference (ISI), crosstalk, echo, and other noise. As data rates increase, the receiver must both equalize the channel, to compensate for such corruptions, and detect the encoded signals at increasingly higher clock rates. Decision-feedback equalization (DFE) is a widely used technique for removing intersymbol interference and other noise at high data rates. For a detailed discussion of decision feedback equalizers, see, for example, *Digital Communication Principles* by R. Gitlin et al (Plenum Press 1992) and *Digital Communications* by E. A. Lee and D. G. Messerschmitt (Kluwer Academic Press, 1988), each incorporated by reference herein in their entirety.

Generally, decision-feedback equalization utilizes a multi-tap equalizer to equalize the channel using a feedback loop based on previously detected (or decided) data. In one typical DFE implementation, a received analog signal is sampled after DFE correction and compared to one or more first thresholds to generate the detected data and one or more second thresholds usually but not necessarily different from the first) to generate adaption error signals as will be described below. The DFE correction is subtracted in a feedback fashion to produce a DFE-corrected signal. A clock, generated from the received signal by a Clock Recovery (CR) circuit, is generally used to sample the DFE-corrected signal and for the DFE operation. An example of such a receiver is disclosed in "Method and Apparatus for Generating One or More Clock Signals for a Decision-Feedback Equalizer Using DFE Detected Data", by Aziz et al, U.S. Pat. No. 7,616,686, incorporated by reference herein in its entirety.

The receiver described in the patent utilizes a DFE-based phase detection architecture for clock and data recovery of a DFE-equalized signal.

A DFE-based receiver might include an analog front end (AFE), typically having an adjustable gain amplifier (AGA) used to control the input signal level, and an equalizer used to compensate for frequency-based distortions in the input signal to the receiver. The analog equalizer (also referred to herein as a continuous-time linear equalizer or CTLE) in the AFE is generally implemented as an analog-based filter with at least one adjustable coefficient or peaking parameter that can at least partially compensate for frequency-dependent distortions in the received signal. For example, high frequency portions of the received signals might be attenuated as the signals pass though a transmission line, rounding off what are otherwise sharp, square-wave signals as originally transmitted. The CTLE's coefficients or peaking parameters, in response to a controller within the receiver, are adjusted to add gain to the high frequency components of the signal, referred to herein as "peaking", to at least partially restore the received signal to its original shape. However, the analog circuitry in the AFE might have inherent limitations, one of which is the amount of nonlinear distortion introduced onto the received signal by various analog circuits in the AFE. Any distortion introduced by the AFE can seriously degrade performance of the overall receiver.

As data rates increase for serializer/deserializer (SERDES) communications applications, the "quality" of the channel media degrades dramatically even over short distances between the ends of the communication channel. One technique typically used in conjunction with the receiver's DFE and analog equalizers to achieve the desired channel performance needed for reliable communications over the degraded channel is to pre-distort the transmitted signal to counteract the effects of the channel on the signal presented to the receiver. For high-speed signaling applications, such as 8 Gbps and faster SERDES applications, the pre-distortion characteristics are adjusted through a back or reverse channel to adapt the pre-distortion to the channel's characteristics.

Figure 1:
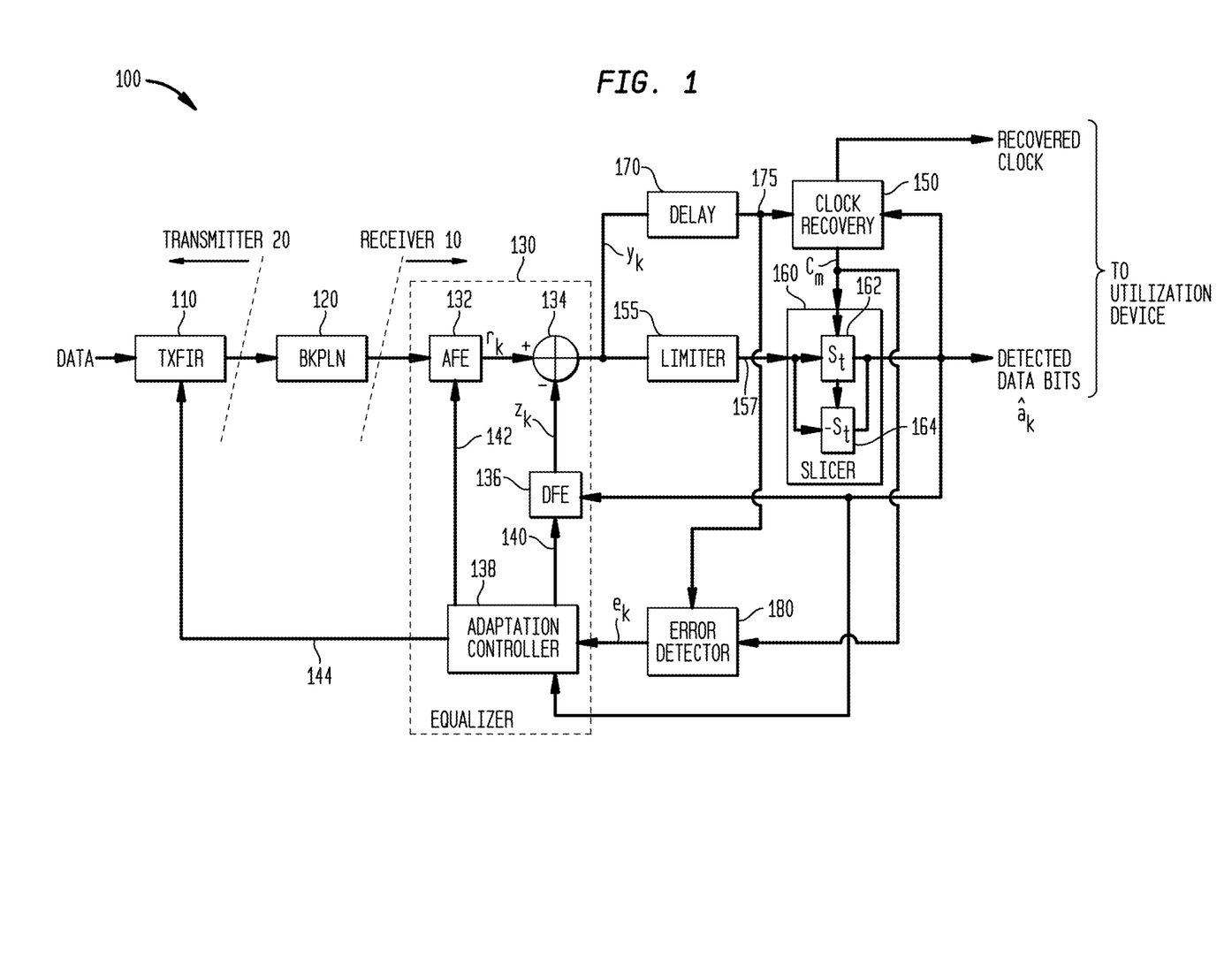
FIG. 1 is a simplified block diagram of a communication system having a transmitter and a receiver communicating over a communication channel as well as a back channel according to one embodiment of the invention.

FIG. 1 is a block diagram of a typical SERDES communication channel 100 having a receiver 10 and a transmitter 20, the transmitter having an equalizer and the receiver having an analog equalizer and a DFE-based equalizer in tandem. As shown in FIG. 1, baseband data from the transmitter 20 is transmitted through a backplane communications channel 120 after optionally being equalized or filtered through a transmit FIR filter (TXFIR) 110. After passing through the backplane (BKPLN) 120, metal traces in a substrate (not shown), a cable (not shown), or a combination thereof, the analog data signal received by the receiver 10 is processed by equalizer 130. The received signal may optionally be filtered or equalized by an analog front end (AFE) 132 having a variable gain amplifier (not shown) for amplitude control and may include, for example, a continuous-time filter or the equivalent. The analog signal output $r_k$ of the AFE 132 passes through subtractor 134, used in conjunction with a decision feedback equalizer (DFE) 136 having L taps and well understood in the art, to produce an output signal $y_k$. The output signal $y_k$ is delayed by a variable delay circuit 170 and the delayed signal on node 175 is then sampled by a clock recovery (CR) circuit 150. A limiter 155, described in more detail below, amplifies the signal $y_k$ and limits the amplified signal on node 157 to a given amplitude centered about a midpoint value, in this example, approximately zero although this value is not critical and can be adjusted as desired but is generally determined by the circuit implementation of the limiter, e.g., a high gain amplifier that is driven into saturation by the signal $y_k$. A slicer 160 (described below) digitizes the output of the limiter 155 by comparing the signal from the limiter to a threshold value and latches the result in response to the data clock generated by the CR 150. In one embodiment, the threshold of the slicer 160 is approximately the same as the midpoint value of the signal from the limiter 155.

In one exemplary embodiment, the limiter 155 is a conventional amplifier (not shown) having enough gain for it to saturate when amplifying the DFE-corrected signal $y_k$. The saturation of the amplifier will limit or clamp the amplified signals to voltage levels related to power supply voltages coupled to the limiter 155. A saturated amplifier might exhibit a propagation delay that results from the amplifier "switching" from one output level to the other in response to a change in the input signal thereto and may be several picoseconds long, a significant portion of the received data's bit period. To reduce or control the amount of propagation delay, the amplifier might have anti-saturation circuitry added thereto as is known in the art. To compensate for the propagation delay of the limiter 155, the variable delay circuit 170 is provided to time-align the DFE-corrected analog signal $y_k$ with the limited signal on node 157, as described in more detail below.

A conventional slicer 160 might be implemented using one or more slicer-latches (i.e., a decision device based on an amplitude threshold and a latch to hold the results of the decision device) or a more complicated detector such as a sequence detector. For high-speed applications, the slicer 160 is often implemented as two slicer-latches 162, 164 that each sample the limited signal on node 157 in response to a locally generated sample clock, here sample clock $C_m$ from CR 150. In addition to sampling the data signal, each slicer-latch in slicer 160 essentially quantizes the signal to a binary "1" or "0" based on the analog value of the signal applied to the slicer, represented here as s, and a slicer threshold, $s_t$. If the input to the slicer 160 at time k is $s_k$, then the detected data bit output $â_k$ of the slicer 160 is given as follows:

$$â_k = 1 \text{ if } s_k > s_t$$
$$= 0 \text{ otherwise.}$$

In this example, the slicer-latch 162 has a slicer threshold $s_t$ and the slicer-latch 164 has a slicer threshold $-s_t$, where $s_t$ is the residual post-cursor tap value of the DFE 136. Alternatively, the slicer threshold values are a fixed value, e.g., zero. The DFE 136 and the post-cursor tap values of the DFE are well known in the art.

The phase of the analog input signal is typically unknown and there may be a frequency offset between the frequency at which the original data was transmitted and the nominal receiver sampling clock frequency. The function of the CR 150 is to generate a clock that allows for the proper sampling of the limited analog signal from limiter 155 such that the data is recovered properly when the signal on node 157 is sampled by slicer 160. The CR 150 may be conventional and is often an adaptive feedback circuit where a feedback loop adjusts the phase and frequency of the nominal clock to produce the modified recovered clock $C_m$ that is used by slicer 160 sample the signal from limiter 155 in the center of the eye opening in the signal to allow proper data detection with margins, as will be illustrated in connection with FIG. 3. In addition, the CR 150 provides a recovered clock signal for use by a utilization device or data sink (not shown) that utilizes the detected data bits $â_k$, as well as an error detector 180 and the DFE 136.

In general, the CR 150 may be composed of several components, such as a phase detector, a loop filter, and a clock generation circuit (not shown). In one embodiment, the CR 150 comprises a bang-bang phase detector (BBPD). For a general discussion of bang-bang phase detectors, see, for example, J. D. H. Alexander, "Clock Recovery from Random Binary Signals," Electronics Letters, 541-42 (October, 1975), incorporated by reference herein in its entirety. Alternatively, the CR 150 comprises a Mueller-Muller CR where the signals are sampled at the baud-rate. For a general discussion of Mueller-Muller CR, see, for example, K. Mueller and K. Muller, "Timing Recovery in Digital Synchronous Data Receivers," IEEE Trans. Comm., Vol. 24, No. 5, May 1976, pp. 516-531, incorporated by reference herein in its entirety.

In one embodiment, a conventional error detector 180 has two sampling latches (not shown) that, in response to the sampling clock $C_m$, samples the time-aligned DFE-corrected signal on node 175 using two different slicing levels to generate an error signal $e_k$. The error signal is used as part of a feedback mechanism to adjust the coefficients of DFE filter 136 via path 140, AFE 132 (if provided) via path 142, and the TXFIR 110 (if provided) via path 144, thereby improving the performance of the system 100. The slicing levels of the sampling latches in the error detector 180 are set to be approximately equal to the magnitude of the primary cursor tap value in the DFE 136. The DFE 136 and the primary cursor tap value of the DFE are well known in the art.

A conventional adaptation controller 138, responsive to the error signal $e_k$ and the detected data bits $â_k$, generates the coefficient control signals for adjusting the one or more coefficient values of the L-tap DFE 136 and the AFE 132. During a training or adaptation phase by the receiver 10, the controller 138, responsive to the detected data bits $â_k$ and the error signal $e_k$, converges one or more coefficient values of the AFE 132 to reduce intersymbol interference during eye openings or to reduce signal transition jitter. An exemplary technique for adapting the AFE is described in "Adaptation Algorithms for a Class of Continuous Time Analog Equalizers With Application to Serial Links", by P. M. Aziz and A V. Malipatil, Proceedings of the 2011 IEEE International Symposium on Circuits and Systems (ISCAS 2011), pp. 1383-1386, included by reference herein in its entirely. Similarly, operation and adaptation of L-tap DFE 136 is well known and explanation of the filter 136 and alternative embodiments thereof may be found in the above-referenced book *Digital Communication Principles* by R. Gitlin et al. For purposes here, the controller 138, in response to the error signal $e_k$ from the error detector 180 and the detected data bits $â_k$ from slicer 160, adjusts the filter coefficient values for the DFE filter 136 at least during the above-mentioned training or adaptation phase by the receiver. The controller 138 uses the well-known least-mean-square algorithm or the like to minimize or reduce below a threshold value the mean-square of the error signal $e_k$. Once the values of the DFE coefficients or AFT coefficients stabilize or converge, a DFE correction signal $z_k$ is generated by a DFE filter 136 from the detected data bits $â_k$ and the correction signal is subtracted by the analog summer 134 from the output $r_k$ of the AFE 132 to produce the DFE-corrected signal $y_k$, where $y_k=r_k-z_k$. Then the DFE-corrected signal $y_k$ is limited by limiter 155 then detected by the slicer 160 to produce the detected data bits $â_k$.

As mentioned above, the threshold values for the slicer 160 and sampling latches in the error detector 180 might be determined by the tap values of the DFE 136 as set by the adaption controller 138. Alternatively, the threshold values might be determined by feedback mechanisms such as that described in the aforementioned U.S. patent application Ser. No. 11/864,110 and U.S. Pat. No. 7,711,043.

In addition to the adaptation of the coefficients of the DFE 136 and AFE 132, the controller 138 might also adjust the coefficients of the TXFIR fitter 110 via path 144. As mentioned above, data to be transmitted is filtered through the TXFIR filter 110 disposed between a serializer and the communication channel media to improve the performance of the system 100 by pre-distorting the signals applied to the conductors in the channel media. An exemplary implementation and technique for adapting the TXFIR is described in the above-identified U.S. patent application Ser. No. 13/360,978, filed 30 Jan. 2012, titled "Transmitter Adaptation Loop Using Adjustable Gain and Convergence Detection", by Mohammad Mobin et al. It is understood that alternative methods and embodiments may be used to implement the TXFIR and the control thereof.

Figure 2:
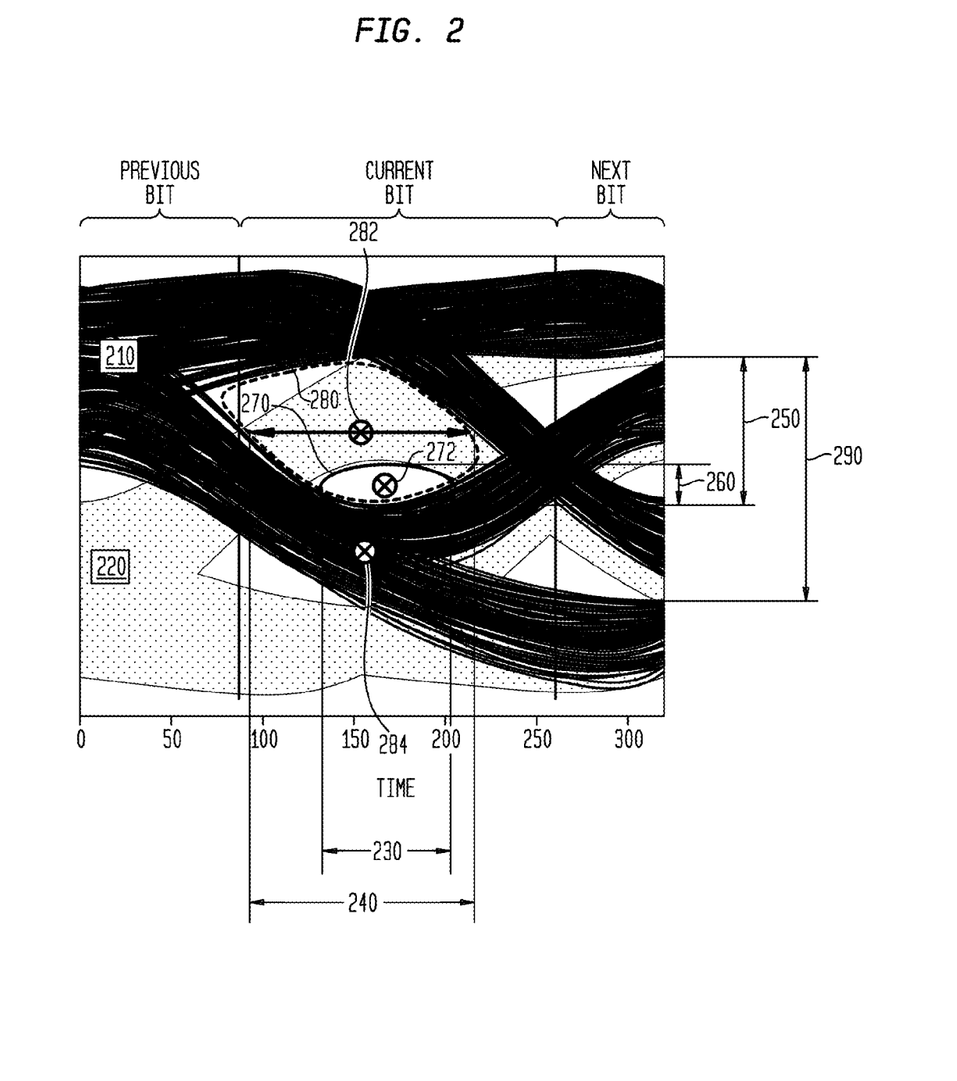
FIGS. 2 and 3 are simplified eye diagrams of received baseband signals.

FIG. 2 illustrates simulated representative traces of the DFE-corrected signal $y_k$ after the DFE, AFE, and TXFIR coefficients have stabilized, i.e., converged, but without the benefit of using a limiter. This image illustrates that the eye opening might have too slow a rise/fall time and is distorted, even with equalization, to make accurate placement of the slicer 160's thresholds (vertical axis) and sample clock phase (horizontal axis) in approximately the middle of the eye opening problematic without using potentially complex and power-hungry adaptive eye placement and DFE adaptation techniques, such as that described in above-identified U.S. patent application Ser. No. 11/541,379, that might not be fast enough for 20 Gbps data rates. In FIG. 2, signal traces for $1 \rightarrow x$ and $0 \rightarrow x$ data transitions in the DFE-corrected signal $y_k$ are shown with different shading. When viewing the DFE-corrected signal as a superposition of the two sets of data transitions, the size of the data eye opening is approximately associated with the inner circle 270, having an associated timing margin 230 (horizontal axis) and noise margin 260 (vertical axis). The small size of the data eye 270 with the corresponding poor margins 230 and 260 makes it very difficult to place sample point 272 to properly recover the transmitted data. The size of the data eye 270 is constrained because of remaining distortion in the $1 \rightarrow x$ data transitions 210 and the $0 \rightarrow x$ data transitions 220 even though the DFE and AFE have both converged. When the received signal is viewed to only have the $1 \rightarrow x$ transitions 210, the distortion that would normally be associated with the $0 \rightarrow x$ transitions is absent and the resulting upper DFE eye, approximately associated with the circle 280, is larger than the small data eye 270 associated with both sets of transitions. The upper DFE-corrected eye 280 has an associated timing margin 240 and noise margin 250. Likewise, when the data is viewed to only have $0 \rightarrow x$ transitions 220, the distortion that would normally be associated with the $1 \rightarrow x$ transitions is absent and the resulting lower DFE eye is larger than the small data eye associated with both data transitions present.

Using sample point 282 and corresponding sample point 284 (positioned to have approximately the same phase as the sample point 282 but with the threshold value of $-s_t$) to sample the DFE-corrected signal $y_k$, there is an improvement in performance of the receiver but the phase of the sample clock is advanced from that of sample point 272 and might still have margin problems that limit the performance of the receiver. Moreover, the adjustment of the sample clock can be difficult and processing intensive, such as that disclosed in the aforementioned U.S. patent application Ser. No. 11/541,379.

Figure 3:
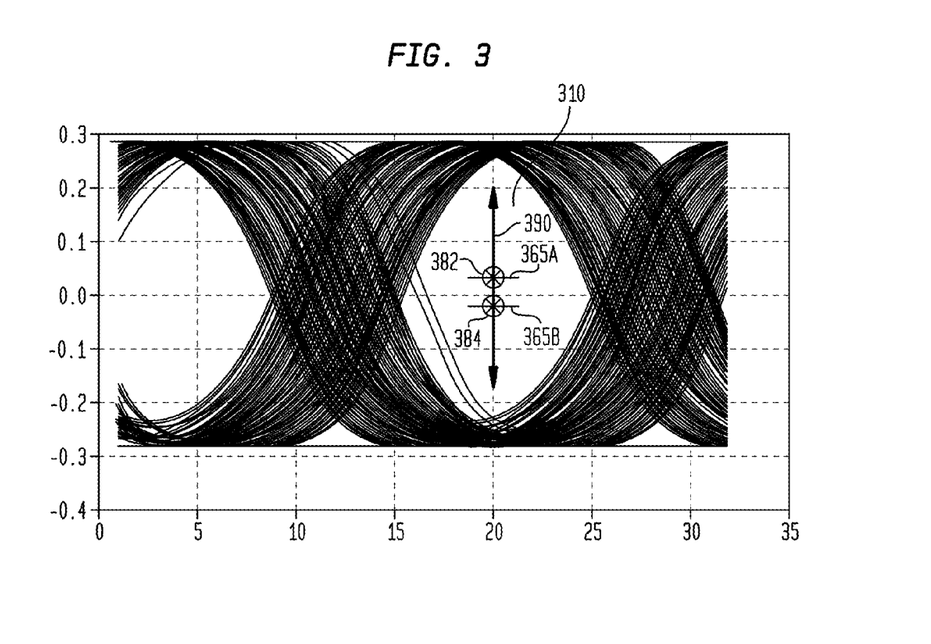

One effect of the limiter 155 (FIG. 1) on the DFE-corrected signal $y_k$ shown in FIG. 2 is to increase the height (along the vertical axis) of eye opening as illustrated in the signal traces shown in FIG. 3. The vertical opening of the eye 310 is now at least as large as the difference between the extremes of the eye openings for the individual $0 \rightarrow x$ and $1 \rightarrow x$ transitions, illustrated by noise margin 290 and 390 in FIGS. 2 and 3, respectively. Another effect of the limiter 155 is that the data eye 310 of the amplitude-limited signal (here the signal on node 157 in FIG. 1) shown in FIG. 3 has more symmetry than that of the signal shown in FIG. 2, giving a greater timing (horizontal) margin. Because the eye has fast rise and fall times, the center of the horizontal opening of the eye does not change significantly with the value of the slicer threshold $s_t$, making the horizontal positioning of the sample points 282, 284 relatively insensitive to the value of $s_t$. The larger data eye allows for the placement of the slicer thresholds $s_t$, $-s_t$ (illustrated here as levels 365A and 365B, corresponding to slicer levels $s_t$ and $s_t$ for slicer-latches 162, 164 in slicer 160 of FIG. 1) and position or phase of the sample clock, $C_m$, which causes the slicer-latches 162, 164 to sample at sample points 382, 384 the limited signal applied thereto in approximately the middle of the data eye 310, to have more margin, and thus to be less critical, than that required to correctly sample the signal shown in FIG. 2.

Figure 4:
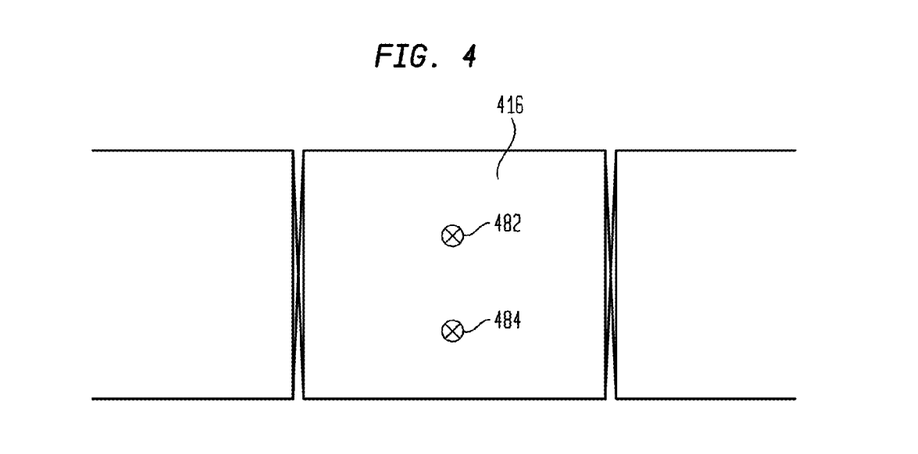
FIG. 4 illustrate the effects of an ideal limiter on eye openings.

The height, width, and symmetry of the eye opening in FIG. 3 is also dependent on how "hard" the limiting action is and the amount of gain provided by the limiter 155. The harder the limiter, i.e., the amount of compression the limiter provides once the limiter saturates (typically measured in the amount of change in the output amplitude for a given change in input amplitude), the less variation in the amplitude (vertical axis) of the eye opening. All else being equal, the higher the gain of the limiter the larger the vertical opening the eye opening is. As illustrated in FIG. 4, a perfect limiter has infinite gain and no variation in the amplitudes of the output signal to produce, for example, a perfect "square wave" having variable width pulses with amplitudes limited by the voltage of the limiter's power supply. Because of the essentially rectangular opening of the data eye 410, sample points 482, 484 (corresponding to the slicing thresholds $s_t$, $-s_t$ of slicer 160) is simply placed in the center of the data eye 410. There is no need to adjust the phase of the sampling clock $C_m$ to move the sample point 482, 484 either earlier or later in time.

A practical limiter, such as that used to produce the signal traces in FIG. 3, has high but finite gain resulting in an output signal having a peak amplitude that varies somewhat with the amplitude of the input signal. While the use of a less than ideal limiter 155 will result a smaller eye opening with less steep transitions due to slower rise and fall times, an increase in the opening vertically will result nonetheless, making placement of the slicing thresholds $s_t$, $-s_t$ of slicer 160 relatively less critical. In one exemplary embodiment the gain of the limiter is approximately 6 to 12 dB. Moreover, the phase of the sample clock $C_m$ can be fixed in the center of the eye 310 (FIG. 3) but may also be either advanced or retarded by an amount as needed to provide additional timing margin but without the need for adaptive clock adjustment as taught in the aforementioned U.S. patent application Ser. No. 11/541,379.

While the operation of the slicer 160 might be less critical when using the limiter 155, deriving the clock from the amplitude-limited signal on node 157 might result in the sample clock $C_m$ and the recovered clock having too much jitter for some applications. To reduce the amount of jitter in the various clock signals, the CR 150 derives timing information from the time-aligned DFE-corrected signal on node 175, referred to as the "linear path", instead of from the amplitude-limited signal on node 157, referred to herein as the "nonlinear path".

As mentioned above, the delay 170 is used to time-align the DFE-corrected signal $y_k$ from the subtractor 134 with the output signal from the limiter 155. A controller (not shown but might be implemented by the controller 138) adjusts the amount of delay provided by the delay circuit 170 such that the signals on node 175 are approximately time-aligned with the signals on node 157. Generally, the calibration of the delay circuit 170 occurs after the AFE 132 and the DFE 136 have converged.

In an alternative embodiment, the delay circuit 170 is merged with the CR 150 such that the CR 150 is configured to adjust the phase of the clock $C_m$ as required, as is well known in the phase-locked or delay-locked loop art.

Figure 5:
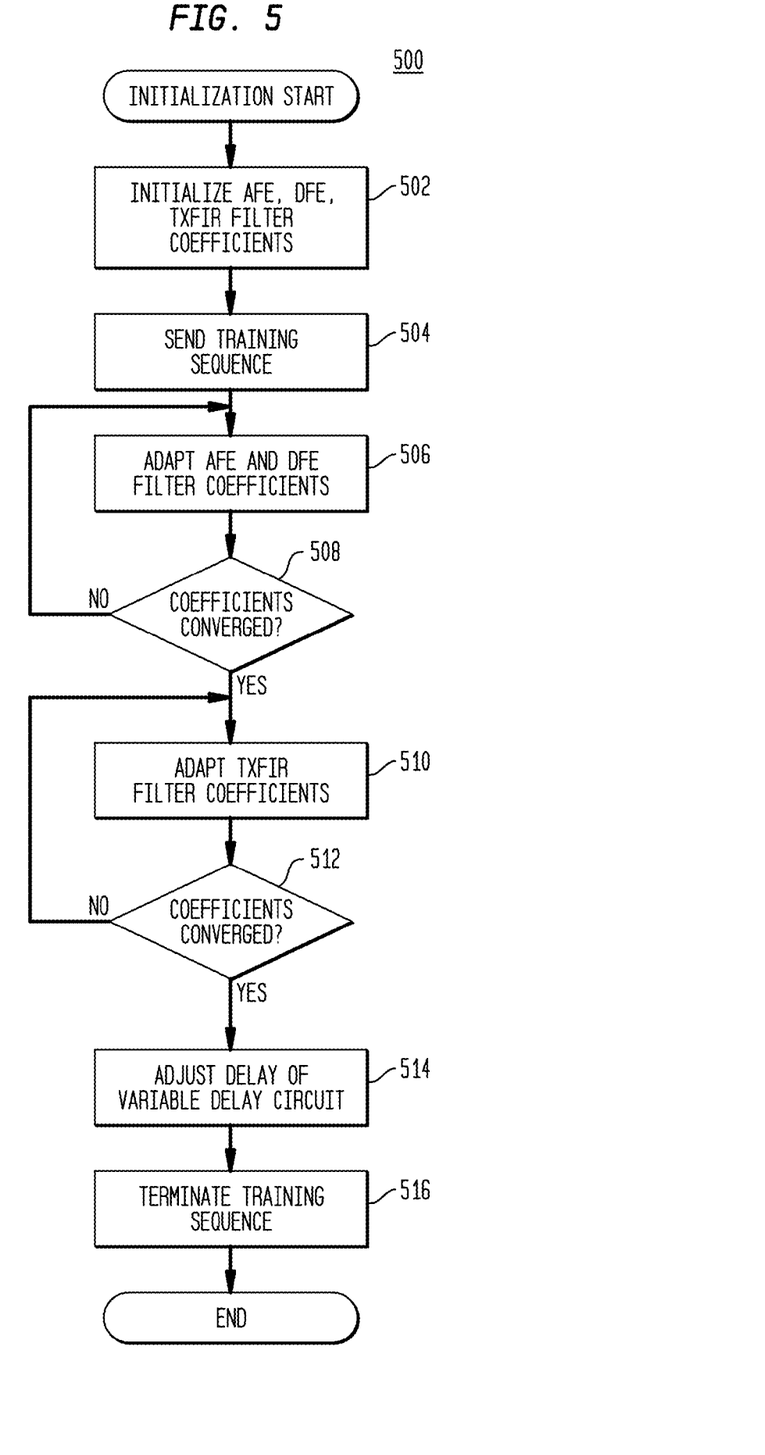
FIG. 5 is a simplified flowchart illustrating initialization of the communication system shown in FIG. 1 according to an embodiment of the invention.

In FIG. 5, an exemplary initialization process 500 of the system 100 (FIG. 1) is shown. In this exemplary process, the coefficients in the TXFIR 110, AFE 130, and DFE 136 (FIG. 1) are set or initialized to a known value in step 502. Then a training sequence, e.g., a randomized data pattern, is sent as data applied to the TXFIR filter 110 in step 504. In response, the controller 138 in step 506 begins the adaptation of the filter coefficients in the AFE 130 and DFE 136 either concurrently or sequentially and repeats step 506 until in step 508 the coefficients have been determined to converge. Then the coefficients in the TXFIR 110 are adjusted until converged in steps 510 and 512. It is understood that the convergence of the TXFIR coefficients might be done concurrently with that of the AFE and DFE. Next, in step 514, the variable delay circuit 170 is adjusted until the signals on nodes 157 and 175 are approximately aligned. Lastly, in step 516, the training sequence is terminated and system 100 begins normal operation.

Generally, the CR 150 is enabled during the entire initialization process 500 so that it locks onto the delayed signal on node 175 to generate the sampling clock $C_m$ and the recovered clock. Alternatively, the CR 150 may be enabled in step 502 and subsequent steps are not performed until the CR 150 has achieved lock.

It is understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A receiver having an input and adapted to receive a signal from a communication channel, comprising:
an equalizer, coupled to the input of the receiver, having an output;
a limiter, coupled to the output of the equalizer, having an output, wherein the limiter is a saturable amplifier;
a variable delay circuit, coupled to the output of the equalizer, having an output;
a decision circuit, coupled to the output of the limiter, having an output and a clock input; and
a clock recovery circuit, coupled to the output of the variable delay circuit and not connected to the output of the limiter, for generating a clock signal coupled to the clock input of the decision circuit.

2. The receiver of claim 1 further comprising:
an adaption circuit, coupled to the output of the decision circuit and the output of the equalizer;
wherein the equalizer is an adaptive equalizer having coefficient values controlled by the adaptation circuit and the decision circuit has at least one threshold value controlled by the adaptation circuit.

3. The receiver of claim 2 wherein the adaptation circuit comprises:
an error detection circuit, coupled to the output of the decision circuit and the output of the adaptive equalizer, for producing an error signal; and
an adaptation controller, coupled to the output of the error detector circuit and the output of the decision circuit, is adapted to implement an adaptation algorithm for reducing the error signal by controlling the coefficients of the adaptive equalizer.

4. The receiver of claim 3 wherein the adaptive equalizer comprises a decision feedback equalizer having multiple tap coefficients controlled by the adaptation controller, the at least one threshold value being substantially equal to one of the tap coefficients.

5. The receiver of claim 3 wherein the adaptation algorithm is a least-mean-square algorithm for reducing a mean-square of the error signal.

6. The receiver of claim 3 further comprising a back channel for communicating transmit filter coefficient values generated by the adaptation controller to a transmitter coupled to the communications channel.

7. The receiver of claim 1 wherein the signal is a baseband digital signal and the communication channel is a backplane.

8. The receiver of claim 1
wherein the clock recovery circuit is coupled to the output of the variable delay circuit, the limiter has a propagation delay, and the variable delay circuit provides a delay for at least partially compensating for the propagation delay of the limiter.

9. The receiver of claim 8 further comprising:
an error detection circuit, coupled to the output of the decision circuit and the output of the variable delay circuit, having an output; and
an adaption controller, coupled to the output of the decision circuit and the output of the error detection circuit;
wherein the equalizer is a multi-tap adaptive equalizer having tap coefficient values controlled by the adaptation controller.

10. A receiver having an input and adapted to receive a signal from a communication channel, comprising:
an analog front end, coupled to the input of the receiver, having an output and at least one filter coefficient;
an adaptive equalizer, coupled to the output of the analog front end, having an output and tap coefficient values;
a limiter, coupled to the output of the equalizer, having an output;
a decision circuit, coupled to the output of the limiter, having an output and a clock input and at least one threshold value;
a variable delay circuit, coupled to the output of the equalizer, having an output;
an error detection circuit, coupled to the output of the decision circuit and the output of the variable delay circuit, for producing an error signal;
an adaption controller, coupled to the output of the decision circuit and responsive to the error signal, adapted to implement a least-mean-squared algorithm for reducing the error signal by controlling the tap coefficient values of the adaptive equalizer, the at least one threshold value of the decision circuit, and the at least one filter coefficient of the analog front end; and a clock recovery circuit, coupled to the output of the equalizer and not connected to the output of the limiter, for generating a clock signal coupled to the clock input of the decision circuit;

wherein the clock recovery circuit is coupled to the output of the variable delay circuit, the limiter has a propagation delay, the variable delay circuit provides a delay for at least partially compensating for the propagation delay, and the threshold value is set to approximately an average value of an output signal on the output of the limiter.

11. The receiver of claim 10 further comprising a back channel for communicating transmit filter coefficient values generated by the adaptation controller to a transmitter coupled to the communications channel;

wherein the signal is a baseband digital signal and the communication channel is a backplane, and the at least one threshold value is proportional to a residual post-cursor tap coefficient value of the adaptive equalizer.

12. The receiver of claim 11 wherein the limiter is a saturable amplifier.

* * * * *